United States Patent Office 2,700,025
Patented Jan. 18, 1955

2,700,025

WAX COMPOSITION FOR FRUITS AND VEGETABLES COMPRISING AN OIL-SOLUBLE, HEAT-REACTIVE PHENOL-ALDEHYDE RESIN, A TERPENE RESIN, AND SUGAR-CANE WAX

Charles D. Cothran, Pomona, Calif., assignor to Brogdex Company, Pomona, Calif., a corporation of California No Drawing. Application March 27, 1951,
Serial No. 217,880

7 Claims. (Cl. 260—28.5)

This invention pertains to improvements in wax base compositions and wax compositions for use in the treatment of fruits and vegetables.

Fruits and vegetables are normally subjected to a cleansing operation and in order to prevent such products from shrinking or losing weight excessively during shipment and storage, very thin films or protective coatings are applied to the external surface of fresh, whole fruits and vegetables. These protective coatings may include hydrogenated oils and various waxes and wax-like compositions. Paraffin has been used extensively in the past. These wax-like compositions may be applied to the fruit by means of brushes (which pick up wax from a slab thereof and then spread it over the fruit), in the form of dispersions and emulsions, which are sprayed upon the fruit, or the waxy composition is fogged upon the surface of the fruit through suitable atomizing nozzles and the fruit then rubbed or polished so as to spread the waxy composition over the surface. The latter treatment is extensively employed in the citrus industry.

The formation of a protective coating upon fruits and vegetables maintains their natural appearance for a prolonged period of time, but numerous requirements have to be met. The coating cannot be continuous or airtight, but instead must form a thin, porous or discontinuous film which permits the fruit to breathe. Furthermore, the film must be substantially transparent so as not to deleteriously affect the natural color of the fruit and the film must be bright and not dull or matt in appearance. The protective coating cannot be tacky or sticky, even though the fruit are exposed to direct rays of the sun. Furthermore, the film must have good adherence to the surface and not flake or peel off. In addition, the coating composition should be easily spreadable upon the surface of the fruit and thereby prevent prolonged brushing or rubbing which might damage the skin. Finally, the coating should be economical.

Paraffin containing carnauba or candelilla wax has been used in the past but has not answered all of the requirements. The trade requires that the coating composition not only retard shrinkage, but in addition, maintain a bright, glossy or shiny appearance to the fruit. It is to be remembered that a freshly washed orange has a natural "shine" which slowly dulls and becomes lost in approximately forty-eight hours. A similar dulling appears to take place when prior wax compositions are used on the fruit, and it is believed that part of this dulling is due to crystal growth in the wax coating. That such crystal growth should produce a visual effect is surprising, particularly when only about 7 lbs. of wax composition are used in treating a carload (462 boxes) of oranges.

These various requirements have presented a problem to the fruit-packing industry for a long period of time. The present invention is directed to a base composition which, when properly dissolved or dispersed in paraffin and other carriers, may be utilized in forming protective coatings on fruits, vegetables, metallic objects, and wherever a virtually transparent, thin, hard and glossy surface film is desired. Generally stated, the present invention relates to a wax base composition comprising the product of reaction between a phenolic-aldehyde resinoid and a hydrocarbon thermoplastic terpene resin and a deresinified sugar cane wax. These components react upon being heated and form a compatible waxy substance which may be dissolved in paraffin. The solution of the new material in paraffin may then be used in the preparation of emulsions, dispersions and other coating compositions or such paraffin solution may be heated and fogged directly upon the fruits and vegetables to be treated.

An object of the present invention, therefore, is to disclose and provide a new and improved wax base composition and its method of preparation.

A further object of the invention is to disclose and provide an improved waxy composition for use in the treatment of various fruits, vegetables and other objects upon which it is desired to form a thin, virtually transparent and glossy film.

Again, an object of the present invention is to disclose and provide conditions, proportions and methods whereby adherent, easily spread, non-viscous, non-tacky, protective films may be produced upon fruits and vegetables.

These and various other uses, advantages and objects of the invention will become apparent from the following description of exemplary compositions and their methods of preparation. In such description, particular reference will be made to the preparation of waxy compositions for use in the treatment of citrus fruit, such as oranges, lemons, grapefruit and the like, it being understood that the same or similar compositions may be employed in the formation of protective films upon other fruits, such as apples, pears, etc. and on a great variety of vegetables, such as tomatoes, melons, cucumbers, green peas, etc.

It has been discovered that phenolic-aldehyde resinoids will react with thermoplastic terpene resins when these two materials are heated together so as to produce a reaction product which inhibits the formation of large crystals in paraffin and which imparts to paraffin (and other carriers) highly desirable properties, such as increased shrinkage control, better adherence, higher gloss, greater spreadability, etc. When either of the two starting materials is added to paraffin alone, the resulting product is not satisfactory; the reaction product obtained by coupling the two starting ingredients imparts characteristics to the finished product which cannot be attained by either one of the ingredients or by the simple admixture of the ingredients.

The phenolic-aldehyde resinoids or resins for use in the manufacture of the product of this invention are preferably made from an alkyl-substituted phenol and formaldehyde and are heat-reactive, hard and relatively high-melting resinoids. (The manufacture of such oil-soluble phenolics is described in Industrial and Engineering Chemistry, January 1951, pages 134–140 and patents there cited.) A specific example of such oil-soluble, heat-reactive resinoid is a p-tert-butylphenol resin with a formaldehyde-phenol ratio of 2:1. The preferred phenolic resins exert a polymerizing effect on ester gums and are soluble in vegetable oils and hydrocarbons, petroleum solvents and chlorinated hydrocarbons, such as carbon tetrachloride; they are slightly soluble in ether and alcohol; they are moderately soluble in melted paraffin, precipitating therefrom, in part, when paraffin solidifies; they are insoluble in water and substantiallly insoluble in alcohol acetone and glycols. Further illustrating the heat-reactive phenolic resins suitable for use in this invention are those which have a specific gravity of between about 1.15 and 1.174 (Westphal balance), a melting point of between 175° F. and 210° F. (modified ASTM ball and ring method) and show no positive test for rosin under the Liebermann-Storch test. They lose viscosity and become fluid at about 300° F.

As pointed out hereinabove, the heat-reactive phenolic resinoids are slightly soluble in paraffin and therefore cannot be used alone. In accordance with the present invention, these reactive phenolic resins are reacted with a thermoplastic terpene resin, preferably containing a mixture of condensed and polymerized saturated terpadienes. The most desirable of these resins are chemically stable and normally non-reactive and have a melting point of between about 120° C. and 135° C. They are water-insoluble, not affected by alkalies or weak acids and relatively insoluble in alcohol and acetone; they are soluble in oil solvents, paint oils, chlorinated solvents, paraffin and vegetable waxes. These thermoplastic terpene resins are preferably substantially neutral (having an acid number of less than 4) and unsaponifiable (having a saponification number of less than 4).

Suitable resins are those resulting from the polymerization of a terpene starting material consisting in large part of beta-pinene. Resins of this type and their method of manufacture are described in Patent No. 2,335,912 and are manufactured by Pennsylvania Industrial Chemical Corporation under the name "Piccolyte."

In accordance with the present invention, the reactive phenolic resinoid and the thermoplastic terpene resin are melted together, maintaining a ratio of between about 1:0.5 and 1:4.0 by weight between the phenolic resinoid and the terpene resin. Very good results are obtained when these two ingredients are used in substantially equal quantities. It has been found desirable to melt the terpene resin first and then incorporate the phenolic and reactive resin, maintaining a temperature of about 325° F. for not less than about 20 or 30 minutes. During heating and agitation a reaction takes place accompanied by foaming and the evolution of formaldehyde vapors. Complete reaction is attained in approximately three to four hours, although heating for this protracted length of time is accompanied by darkening in color and is not necessary for the purposes of the present invention. In order to insure a light-colored reaction product, heating is preferably carried out under a non-oxidizing atmosphere.

In order to reduce volumetric changes and shrinkage upon cooling in the reaction product, small amounts of stearic acid, linseed oil and rosin or montanic acid may be added, these ingredients simultaneously expediting or speeding the reaction. These additives may be added in amounts equivalent to 1%–4% of the total weight, although montanic acid may be added in quantities of about 10% of the total.

Upon cooling the product of reaction, it will be found that a solid, relatively brittle resin varying in color from approximately straw to dark brown has been produced, the darker colors being obtained by the use of higher temperatures. This reaction product may be used to good advantage in coating metallic objects, metal sheets, etc., as a rust preventive, and on leather, wood, etc. It can be dispersed in oils as a vehicle to be used as a protective coating. For the preparation of coatings particularly adapted for use on fruits and vegetables it has been discovered that best results are obtained by melting the mixture of oil-soluble phenolic resinoid and terpene resin with a proportion of deresinified sugar cane wax.

Sugar cane wax is a wax derived from the exterior coating of sugar cane and is recovered from sugar cane from first boiling operations by steaming and by purification with solvents. For use in conjunction with the phenolic, reactive resins and thermoplastic resins previously mentioned, it is preferred to use a green-colored purified sugar cane wax which is characterized by the presence of very small crystals of uniform size. For example, at the end of about six hours, the crystals exhibited by sugar cane are only 1/50 to 1/100 of the size of paraffin crystals in their longest dimension. The deresinified or purified green sugar cane wax used successfully in the compositions of the present invention had an acid value of about 5–6, a melting point of between about 168° F. and 172° F., was readily saponifiable, appeared to contain fatty acids and fatty alcohols which enter into an ester-like reaction with the phenolic resinoid and the wax had solubility characteristics which are similar to those of carnauba and other vegetable waxes.

Wax compositions particularly adapted for use in the treatment of fruits and vegetables may contain from about 30% to 90% by weight of the sugar cane wax. The following tabulation gives typical compositions of the base wax.

|  | A | B | C | D |
|---|---|---|---|---|
|  | Percent | Percent | Percent | Percent |
| Phenolic-aldehyde resinoid | 5 | 12.5 | 25 | 35 |
| Hydrocarbon terpene resin | 5 | 12.5 | 25 | 35 |
| Sugar cane wax | 90 | 75 | 50 | 30 |

It is to be remembered that although in the above tabulation equal weights of the phenolic and terpene resin are shown, the ratio between the phenolic resinoid and terpene resin may vary within the limits previously stated. When four parts of terpene resin are used to each part of the phenolic resinoid, the solubility of the base wax in paraffin is increased but the melting point is reduced somewhat. If, on the other hand, the phenolic resinoid is present in large excess (say four parts of the phenolic resin to one part of the terpene resin) the base wax becomes difficultly soluble in paraffin and tends to precipitate therefrom.

When it is desired to form protective coatings on citrus fruit by the use of the so-called hot wax method (in which the wax composition is melted and then fogged or atomized upon the fruit), from about 10% by weight to 25% by weight of the above-identified wax base may be dissolved in 75% to 90% by weight of paraffin, the paraffin preferably having a melting point of between about 128° and 130° F. The wax base dissolves in the paraffin and forms a homogeneous mass. Upon being fogged upon the fruit (in a process of the type described in Patents No. 1,940,530 and No. 2,364,946) it will be found that the wax adheres excellently, spreads easily, does not require prolonged brushing, is not viscous, is not tacky, retards shrinkage excellently (reduces the shrinkage loss on a weight basis to only about 40% of the loss exhibited by uncoated fruit), and is surprisingly economical. As previously stated, about 7 lbs. of prior wax compositions have been used per carload of fruit; only 4½ to 5 lbs. of the above wax composition need be used per carload of fruit with better results as far as shrinkage control and gloss are concerned. Since the wax film is glossy and easily spread, a greater quantity of fruit may be passed through the brushing equipment than is the case when other coating compositions are used.

A finished wax composition containing 10% or 15% of the base (phenolic-terpene-sugar cane wax) and 85%–90% of paraffin is eminently suited for use in what is known as the "powder wax" method of treating fruits and vegetables, wherein such wax is sprinkled upon the fruit in the form of a dust and then the fruit is brushed and polished. A process of this type is described in Patents No. 1,985,238 and No. 2,364,946. In many instances a slab of the finished wax is continuously abraded by means of a rapidly rotating stiff brush and the particles of wax thus rubbed off deposited upon the fruit.

In making the complete finished wax it has been found desirable to first melt the green wax, then add the terpene resin, reduce the mixture to freely fluid form and then add the reactive phenolic resinoid. During heating of the mixture to 300°–325° for about 30 minutes, reaction takes place with the formation of ester-like linkages, and a homogeneous mass is obtained. This mass can then be added to heated paraffin in which it dissolves and disperses so as to produce a homogeneous final product. The presence of paraffin during the initial stages of reaction slows down the reaction and is not recommended.

Attention is again called to the fact that paraffin alone forms plate-like, or needle-like flat crystals. These crystals continue to grow with time and in three to four days after paraffin is applied in a thin film to the surface of fruit the crystals are sufficiently large so that the originally invisible film of paraffin now becomes visible. This is believed to be the reason why citrus fruit treated with paraffin alone loses its glossy appearance in three or four days and does not exhibit the glossy appearance when it reaches distant markets. The base wax of the instant invention appears to inhibit crystal growth and maintains the desired luster. At the same time it insures proper shrinkage control for a protracted period of time.

Paraffin alone gives adequate shrinkage control but does not impart luster. Green sugar cane wax alone is entirely too hard, does not adhere well to the surface of the fruit and does not give any control over shrinkage; the fruit loses weight and shrinks very rapidly. A combination of paraffin and sugar cane wax gives good initial shine or luster but crystal growth is observed and the luster dulls very quickly. Even the presence of 25% of sugar cane wax does not prevent the development of large paraffin crystals. It is impossible to use the phenolic resinoid alone or in combination with paraffin; the use of the terpene resin in paraffin reduces the melting point to such an extent that the fruit becomes sticky to the touch. The above observations confirm the belief that reaction products are obtained during manufacture of the base wax which produces results incapable of attainment by the use of the individual materials.

It has been found that repeated heating and cooling of the base wax or of the base dissolved in paraffin has a tendency to increase the free fatty acid content and to cause a darkening of the finished wax. This can be eliminated by the introduction of an antioxidant into the wax composition. There are numerous effective antioxidants; from 0.01% to 0.1% propylgallate or slightly larger quantities of ditertiary-butyl-paracresol are examples of satisfactory antioxidants.

It is to be understood that the base wax (with or without the addition of sugar cane wax) may also be dissolved in volatile solvents, such as naphthas and petroleum solvents and sprayed, atomized or fogged upon the fruit to produce a brilliant and glossy coating; the base wax, either alone or in conjunction with paraffin, may be dispersed or emulsified and such emulsions then used in depositing waxy protective coatings upon fruits and vegetables.

All changes and modifications coming within the scope of the appended claims are embraced thereby.

I claim:

1. A wax composition comprising paraffin containing an intimate dispersion and solution of a product obtained by melting together an oil-soluble, heat-reactive, para-alkyl, phenol-aldehyde resin, a terpene resin composed largely of condensed and polymerized beta-pinene, and sugar cane wax; the ratio between the phenol-aldehyde resin and terpene resin being between 1:0.5 and 1:4.0 by weight.

2. A wax composition of the character stated in claim 1, wherein the product constitutes between 5% and 30% of the composition by weight.

3. A wax composition of the character stated in claim 1, wherein the sugar cane wax is in excess of the heat-reactive, phenol-aldehyde resin and in excess of the terpene resin.

4. A wax composition of the character stated in claim 1, wherein the product constitutes between 5% and 30% of the composition by weight and the sugar cane wax is in excess of the heat-reactive, phenol-aldehyde resin and in excess of the terpene resin.

5. A wax composition of the character stated in claim 1 wherein the sugar cane wax is a deresinified sugar cane wax having a melting point of between about 168° F. and 172° F.

6. A wax composition of the character stated in claim 1 wherein the product is obtained by melting together the heat-reactive, phenol-aldehyde resin, terpene resin, and sugar cane wax at a temperature of not less than about 300° F., and the wax composition contains between 5% and 30% of the product.

7. A wax base composition comprising the product of reaction obtained by heating to a temperature of not less than 300° F. a mixture of oil-soluble, heat-reactive, para-alkyl, phenol-aldehyde resin, a terpene resin composed largely of condensed and polymerized beta-pinene, and sugar cane wax, the ratio between the phenol-aldehyde resin and terpene resin being between 1:0.5 and 1:4.0 by weight, said wax base composition containing between about 30% and 90% sugar cane wax.

References Cited in the file of this patent

UNITED STATES PATENTS

| | | |
|---|---|---|
| 2,122,543 | Tomsicek et al. | July 5, 1938 |
| 2,163,637 | Thomas | June 27, 1939 |
| 2,503,920 | Ricke | Apr. 11, 1950 |